United States Patent
Xu et al.

(10) Patent No.: US 8,538,089 B2
(45) Date of Patent: Sep. 17, 2013

(54) METHOD OF PERFORMING EYEBROW SHAPING ON AN IMAGE AND RELATED COMPUTING DEVICE

(75) Inventors: HeHuan Xu, Hangzhou (CN); JianFeng Li, Hangzhou (CN); Jin Wang, Hangzhou (CN)

(73) Assignee: ArcSoft (Hangzhou) Multimedia Technology Co., Ltd., Hangzhou, Zhejiang Province (CN)

( * ) Notice: Subject to any disclaimer, the term of this patent is extended or adjusted under 35 U.S.C. 154(b) by 0 days.

(21) Appl. No.: 13/338,265

(22) Filed: Dec. 28, 2011

(65) Prior Publication Data
US 2013/0170766 A1 Jul. 4, 2013

(51) Int. Cl.
*G06K 9/00* (2006.01)
*G06K 9/36* (2006.01)

(52) U.S. Cl.
USPC ............ 382/115; 382/118; 382/282; 382/283

(58) Field of Classification Search
USPC ................. 382/118, 167, 254, 274; 358/531; 345/581, 619, 694
See application file for complete search history.

(56) References Cited

U.S. PATENT DOCUMENTS

| | | | | |
|---|---|---|---|---|
| 5,990,901 A * | 11/1999 | Lawton et al. | | 345/581 |
| 6,826,312 B1 * | 11/2004 | Takemura | | 382/282 |
| 7,082,211 B2 * | 7/2006 | Simon et al. | | 382/118 |
| 2007/0258656 A1 * | 11/2007 | Aarabi | | 382/254 |
| 2008/0187224 A1 * | 8/2008 | Wang et al. | | 382/190 |
| 2011/0084962 A1 * | 4/2011 | Kim et al. | | 345/419 |
| 2012/0177288 A1 * | 7/2012 | Chaussat et al. | | 382/165 |

* cited by examiner

*Primary Examiner* — Andrae S Allison
(74) *Attorney, Agent, or Firm* — Winston Hsu; Scott Margo (57) ABSTRACT

A method of performing eyebrow shaping on an image containing a face with eyebrows visible on the face includes loading the image into a computing device having a processor. The processor selects a mask from a predefined list of masks, the mask having a desired eyebrow shape to be used for shaping the eyebrows shown in the image. The processor then adjusts the mask according to a shape of the face to produce an adjusted mask. Next the processor simultaneously superimposes the adjusted mask over the eyebrows and thins the eyebrows by changing an overall vertical height of the eyebrows in order to produce shaped eyebrows. The processor then outputs an enhanced image having the shaped eyebrows.

12 Claims, 8 Drawing Sheets

METHOD OF PERFORMING EYEBROW SHAPING ON AN IMAGE AND RELATED COMPUTING DEVICE

BACKGROUND OF THE INVENTION

1. Field of the Invention

The invention relates to image enhancement, and more particularly, to a method of performing eyebrow shaping on an image containing a face with eyebrows visible on the face.

2. Description of the Prior Art

With the increasing popularity of computing devices, including desktop computers, notebook computers, tablet computers, and even mobile phones, users often wish to send and receive pictures to other users. For instance, a mobile phone user may wish to take a self-portrait picture with a camera of the computing device, and then share the picture with others. The picture can be shared via electronic mail (email), a video chat program, or even through social networking sites such as Facebook®.

However, users often wish to beautify the pictures before they share the pictures with others, especially the eyebrows shown on the pictures. As a result, there exists a need for an easy way to enable users to enhance images in order to beautify the images to the user's liking.

SUMMARY OF THE INVENTION

It is therefore one of the primary objectives of the claimed invention to provide a method and computing device for performing eyebrow shaping on an image containing a face in order to conveniently shape the eyebrows.

According to an exemplary embodiment of the claimed invention, a method of performing eyebrow shaping on an image containing a face with eyebrows visible on the face is disclosed. The method includes loading the image into a computing device having a processor. The processor selects a mask from a predefined list of masks, the mask having a desired eyebrow shape to be used for shaping the eyebrows shown in the image. The processor then adjusts the mask according to a shape of the face to produce an adjusted mask. Next the processor simultaneously superimposes the adjusted mask over the eyebrows and thins the eyebrows by changing an overall vertical height of the eyebrows in order to produce shaped eyebrows. The processor then outputs an enhanced image having the shaped eyebrows.

According to another exemplary embodiment of the claimed invention, a computing device for performing eyebrow shaping on an image containing a face with eyebrows visible on the face is disclosed. The computing device includes a memory for storing the image and a processor for loading the image and selecting a mask from a predefined list of masks, the mask having a desired eyebrow shape to be used for shaping the eyebrows shown in the image. The processor then adjusts the mask according to a shape of the face to produce an adjusted mask. Next the processor simultaneously superimposes the adjusted mask over the eyebrows and thins the eyebrows by changing an overall vertical height of the eyebrows in order to produce shaped eyebrows. The processor then outputs an enhanced image having the shaped eyebrows.

It is an advantage that the present invention provides a simple and efficient method of shaping the eyebrows to beautify the eyebrows while not affecting other regions of the face. In this way, the eyebrows of the image can be reshaped into another shape desired by a user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
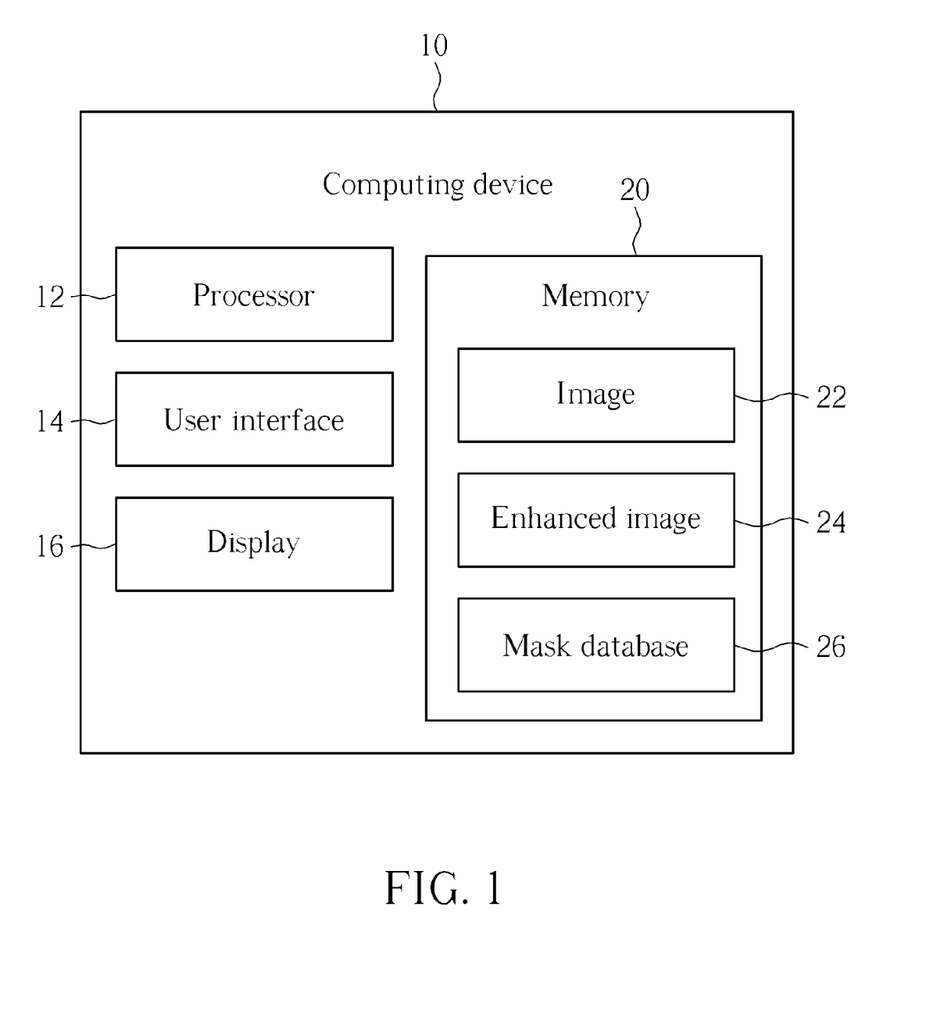
FIG. 1 is a functional block diagram of a computing device according to the present invention.

Please refer to FIG. 1. FIG. 1 is a functional block diagram of a computing device 10 according to the present invention. The computing device 10 contains a processor 12 for controlling operation of the computing device 10 and for executing commands for the computing device 10, a user interface 14 for enabling a user to use the computing device 10, a display 16 for displaying images, and a memory 20. The memory can store at least one image 22, at least one enhanced image 24, and a mask database 26 for storing a plurality of masks utilized for shaping eyebrows. The processor 12 can execute image enhancing processes in order to convert the image 22 into the enhanced image 24.

Figure 2:
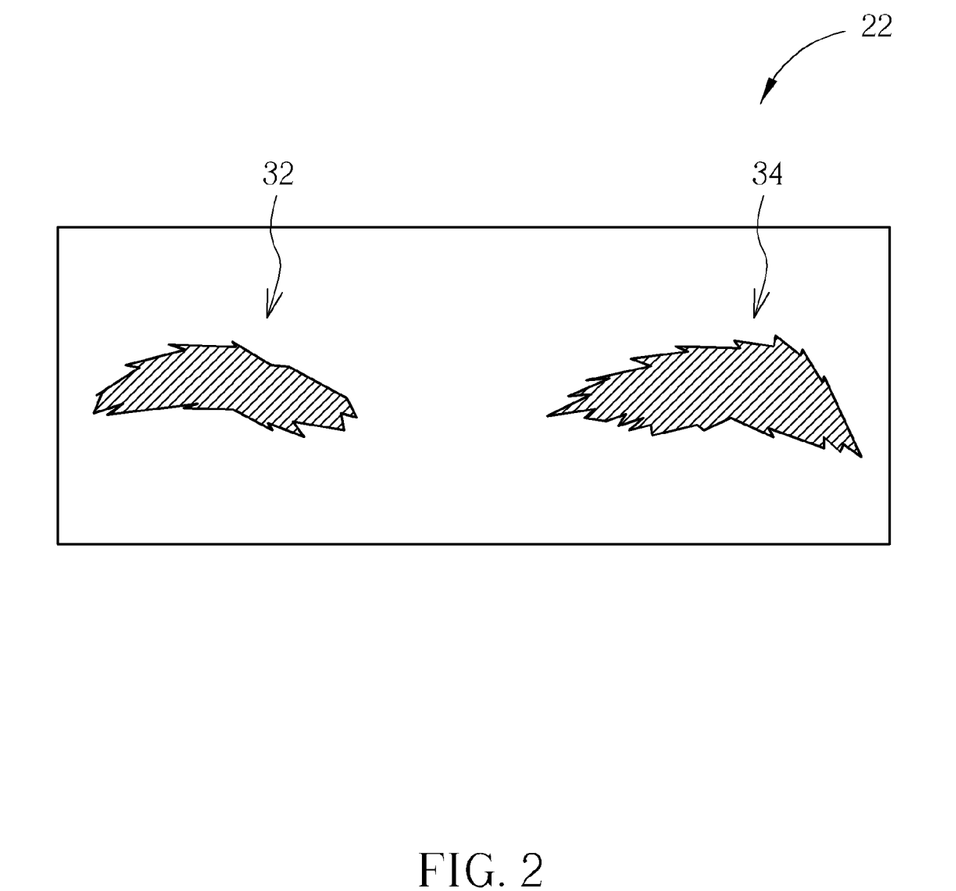
FIG. 2 illustrates an image containing a face with eyebrows visible on the face.

Please refer to FIG. 2. FIG. 2 illustrates the image 22 containing a face with eyebrows 32 and 34 visible on the face. The eyebrows 32 and 34 shown in the image 22 are the original eyebrows contained in a photograph that was saved as the image 22.

Figure 3:
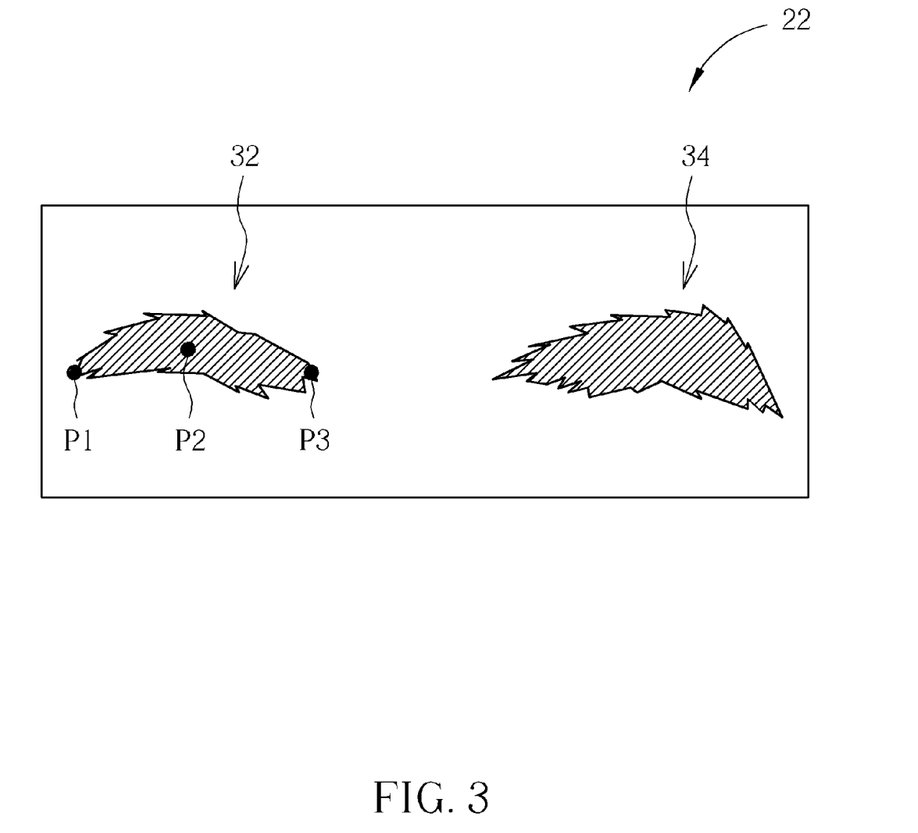
FIG. 3 illustrates the image having feature points assigned to the eyebrow for representing a shape of the eyebrow.

Please refer to FIG. 3. FIG. 3 illustrates the image 22 having feature points P1, P2, and P3 assigned to the eyebrow 32 for representing a shape of the eyebrow 32. The eyebrow 32 will be used as an example in the following discussion although the same procedure used for shaping the eyebrow 32 can also be used to shape the eyebrow 34.

Figure 4:
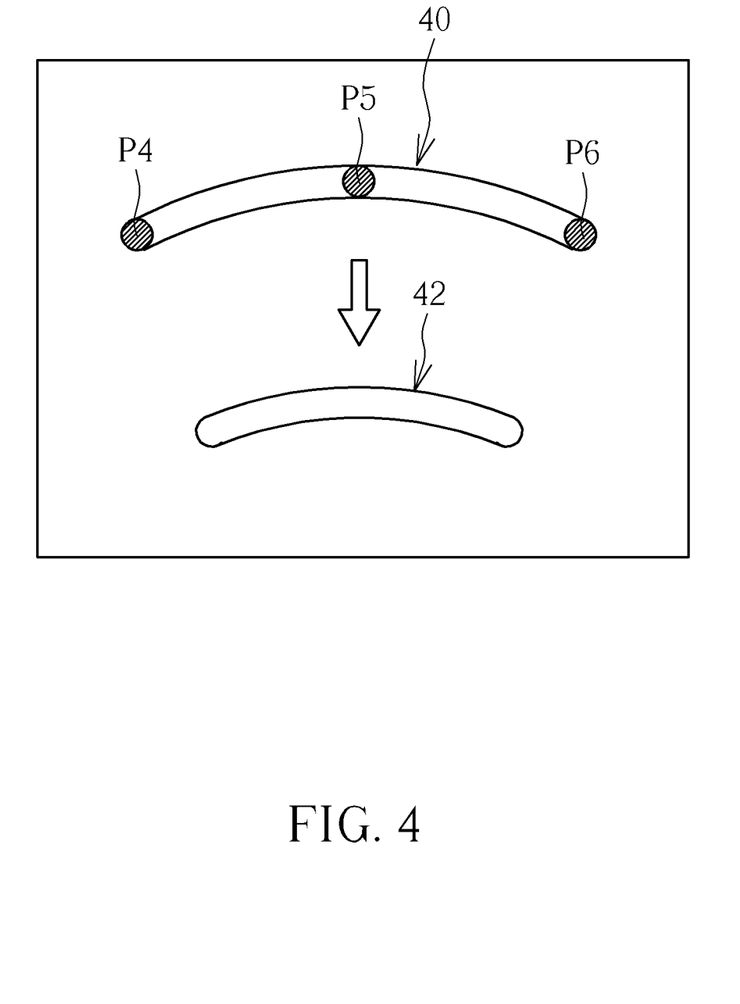
FIG. 4 illustrates a mask selected for shaping the eyebrow, and an adjusted mask custom generated for the image based on the mask according to the present invention.

Next, in order to shape the eyebrows 32 and 34, a mask containing a desired mask shape is selected from the mask database 26. Please refer to FIG. 4. FIG. 4 illustrates a mask 40 selected for shaping the eyebrow 32, and an adjusted mask 42 custom generated for the image 22 based on the mask 40 according to the present invention. Similar to the feature points P1, P2, and P3 assigned to the eyebrow 32 as shown in FIG. 3, the mask 40 also has feature points P4, P5, and P6 that represent a shape of the mask 40. Since the mask 40 represents a general eyebrow shape, and cannot be directly applied to all faces without some adjustment, an adjustment process is performed for generating the adjusted mask 42 from the mask 40.

The feature points P1, P2, and P3 of the eyebrow 32 are matched with the feature points P4, P5, and P6 of the mask 40 in order to modify a size of the mask 40 according to a size of the eyebrow 32. Next, the shape of the mask 40 is adjusted slightly in order according to the shape of the face shown in the image 22 to produce the adjusted mask 42. The adjusted mask 42 will then be used in the shaping process for shaping the eyebrow 32. A similar process is also used for adjusting a mask corresponding to the eyebrow 34. Please note that the example above using three feature points for both the mask 40 and the eyebrow 32 is not intended to be limiting. The number of feature points used can be fewer or more than three in the present invention.

Figure 5:
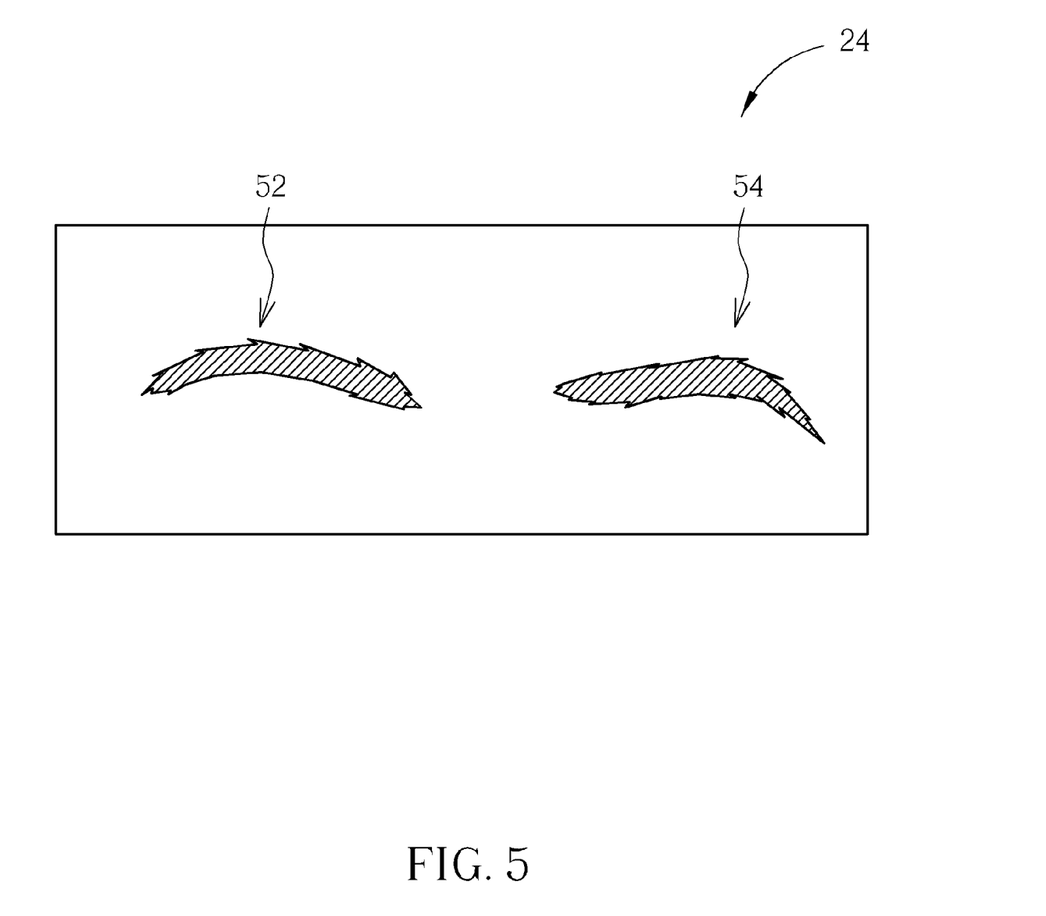
FIG. 5 illustrates the enhanced image containing shaped eyebrows after the present invention shaping process has been performed to the eyebrows of the image.

Please refer to FIG. 5. FIG. 5 illustrates the enhanced image 24 containing shaped eyebrows 52 and 54 after the present invention shaping process has been performed to the eyebrows 32 and 34 of the image 22. When performing the present invention shaping process, the adjusted mask 42 is superimposed over the eyebrows 32 and 34 of the image 22. At the same time, the hairs in the eyebrows 32 and 34 are thinned such that the vertical height of the shaped eyebrows 52 and 54 is less than is less than the vertical height of the eyebrows 32 and 34. As can be seen from comparing the shaped eyebrows 52 and 54 in the enhanced image 24 shown in FIG. 5 to the eyebrows 32 and 34 in the image 22 shown in FIG. 2, the vertical height of the shaped eyebrows 52 and 54 is less than that of the eyebrows 32 and 34. Furthermore, after performing the thinning process, the hairs of the shaped eyebrows 52 and 54 are made to fit within the shape of the adjusted mask 42.

The present invention shaping process therefore superimposes the adjusted mask 42 while at the same time thinning the eyebrows 32 and 34 to produce the shaped eyebrows 52 and 54. The adjusted mask 42 provides the basic shape of the shaped eyebrows 52 and 54, while the thinning process reduces the vertical height of the shaped eyebrows 52 and 54.

Figure 6:
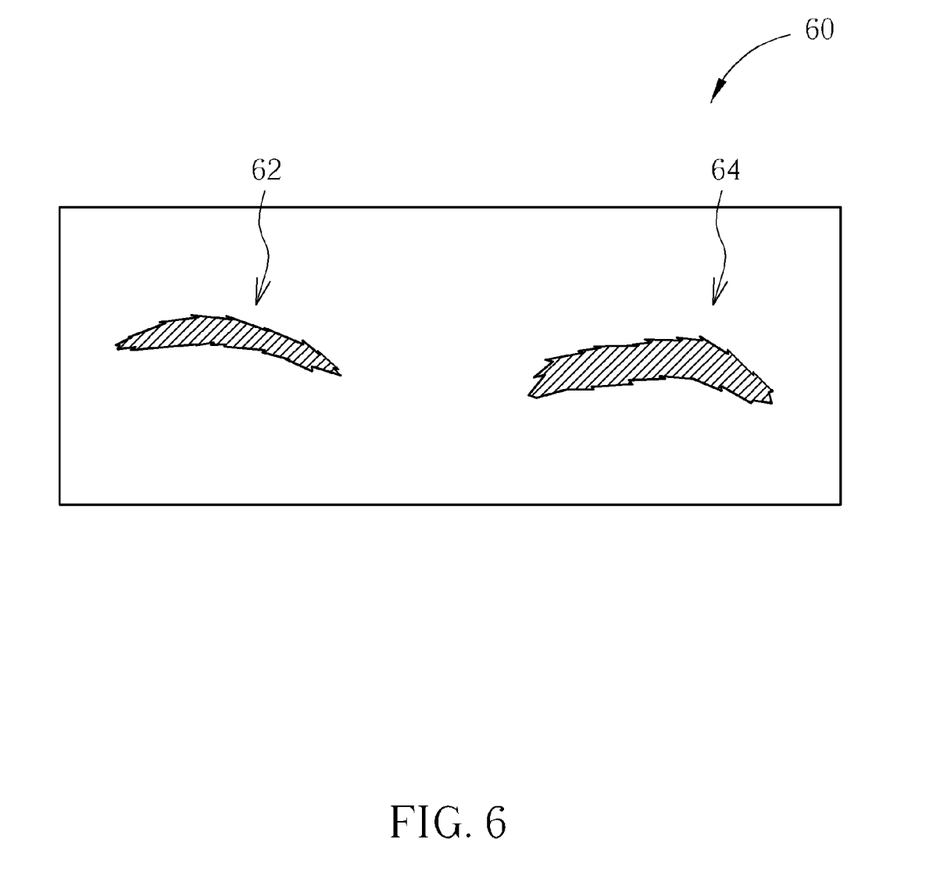
FIG. 6 illustrates an image containing shaped eyebrows resulting from only performing a thinning process on the eyebrows in order to change a vertical height of the eyebrows.

For the sake of comparison, please refer to FIG. 6. FIG. 6 illustrates an image 60 containing shaped eyebrows 62 and 64 resulting from only performing a thinning process on the eyebrows 32 and 34 in order to change a vertical height of the eyebrows 32 and 34. As can be seen from comparing the shaped eyebrows 62 and 64 of the image 60 of FIG. 6 to the shaped eyebrows 52 and 54 in the enhanced image 24 of FIG. 5, the lack of the adjusted mask 42 being applied in the image 60 of FIG. 6 has produced the shaped eyebrows 62 and 64 with a less appealing shape.

Figure 7:
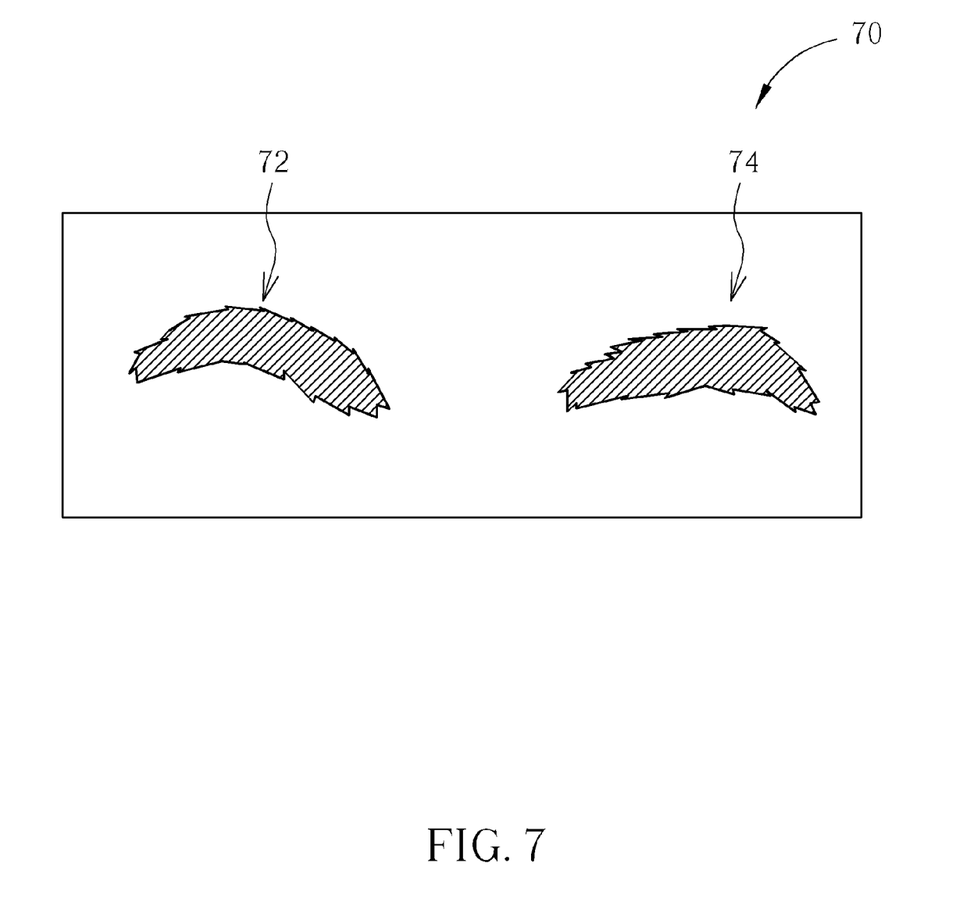
FIG. 7 illustrates an image containing shaped eyebrows resulting from only applying the adjusted mask on the eyebrows in order to change a shape of the eyebrows.

Please refer to FIG. 7. FIG. 7 illustrates an image 70 containing shaped eyebrows 72 and 74 resulting from only applying the adjusted mask 42 on the eyebrows 32 and 34 in order to change a shape of the eyebrows 32 and 34. As can be seen from comparing the shaped eyebrows 72 and 74 of the image 70 of FIG. 7 to the shaped eyebrows 52 and 54 in the enhanced image 24 of FIG. 5, the lack of the thinning process being applied in the image 70 of FIG. 7 has produced the shaped eyebrows 72 and 74 with a larger vertical height.

Figure 8:
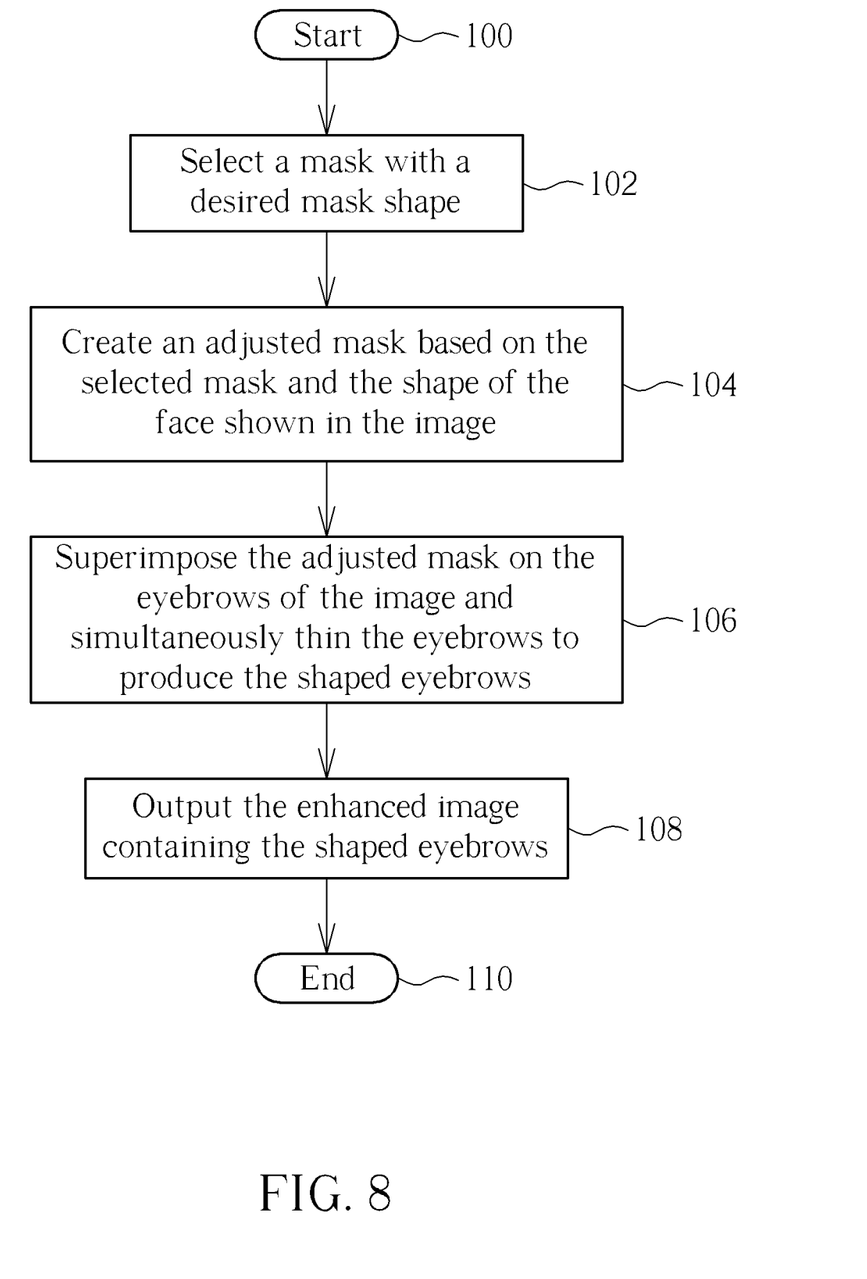
FIG. 8 is a flowchart describing the method of performing eyebrow shaping according to the present invention.

Please refer to FIG. 8. FIG. 8 is a flowchart describing the method of performing eyebrow shaping according to the present invention. Steps in the flowchart will be explained as follows.

Step 100: Start.

Step 102: Select a mask 40 with a desired mask shape from the mask database 26.

Step 104: Create an adjusted mask 42 based on the selected mask 40 and the shape of the face shown in the image 22.

Step 106: Superimpose the adjusted mask 42 on the eyebrows 32 and 34 of the image 22 and simultaneously thin the eyebrows 32 and 34 in order to produce the shaped eyebrows 52 and 54.

Step 108: Output the enhanced image 24 containing the shaped eyebrows 52 and 54.

Step 110: End.

The present invention can be implemented in any kind of computing device 10 such as a desktop computer, a notebook computer, a tablet computer, and a personal digital assistant (PDA), and a mobile phone. Any computing device 10 that has a memory for storing images and a processor for executing the image enhancement process can be used with the present invention enhancement method. Furthermore, the present invention can enhance not only images obtained from photographs, but also can enhance computer generated images.

In summary, the present invention provides a simple and efficient method of shaping eyebrows to beautify the eyebrows while not affecting other regions of the face. In this way, the eyebrows of the image can be reshaped into another shape desired by a user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing eyebrow shaping on an image containing a face with eyebrows visible on the face, the method comprising:
   loading the image into a computing device having a processor, the processor executing the following steps:
      selecting a mask from a predefined list of masks, the mask having a desired eyebrow shape to be used for shaping the eyebrows shown in the image;
      adjusting the mask according to a shape of the face to produce an adjusted mask;
      simultaneously superimposing the adjusted mask over the eyebrows to give the eyebrows the shape of the adjusted mask and thinning the eyebrows to make the hairs of the eyebrows fit within a reduced vertical height less than an original vertical height of the eyebrows in order to produce shaped eyebrows; and
      outputting an enhanced image having the shaped eyebrows.

2. The method of claim 1, wherein after thinning the eyebrows, hairs of the shaped eyebrows fit within a shape of the adjusted mask.

3. The method of claim 1, wherein adjusting the mask according to the shape of the face to produce the adjusted mask comprises:
   assigning a plurality of first feature points to the eyebrows shown in the image for representing a shape of the eyebrows;
   assigning a plurality of second feature points to the mask for representing a shape of the mask; and
   matching the plurality of first feature points with the plurality of second feature points and adjusting the mask according to the shape of the face to produce the adjusted mask.

4. The method of claim 3, wherein the plurality of first feature points comprising three first feature points.

5. The method of claim 3, wherein the plurality of second feature points comprising three second feature points.

6. The method of claim 1, wherein the overall vertical height of the eyebrows is greater than an overall vertical height of the shaped eyebrows.

7. A computing device for performing eyebrow shaping on an image containing a face with eyebrows visible on the face, the computing device comprising:
- a memory for storing the image; and
- a processor for loading the image and executing the following steps:
  - selecting a mask from a predefined list of masks, the mask having a desired eyebrow shape to be used for shaping the eyebrows shown in the image;
  - adjusting the mask according to a shape of the face to produce an adjusted mask;
  - simultaneously superimposing the adjusted mask over the eyebrows to give the eyebrows the shape of the adjusted mask and thinning the eyebrows to make the hairs of the eyebrows fit within a reduced vertical height less than an original vertical height of the eyebrows in order to produce shaped eyebrows; and
  - outputting an enhanced image having the shaped eyebrows.

8. The computing device of claim 7, wherein after thinning the eyebrows, hairs of the shaped eyebrows fit within a shape of the adjusted mask.

9. The computing device of claim 7, wherein adjusting the mask according to the shape of the face to produce the adjusted mask comprises:
- assigning a plurality of first feature points to the eyebrows shown in the image for representing a shape of the eyebrows;
- assigning a plurality of second feature points to the mask for representing a shape of the mask; and
- matching the plurality of first feature points with the plurality of second feature points and adjusting the mask according to the shape of the face to produce the adjusted mask.

10. The computing device of claim 9, wherein the plurality of first feature points comprising three first feature points.

11. The computing device of claim 9, wherein the plurality of second feature points comprising three second feature points.

12. The computing device of claim 7, wherein the overall vertical height of the eyebrows is greater than an overall vertical height of the shaped eyebrows.

* * * * *